US011877095B2

(12) United States Patent
Zieser et al.

(10) Patent No.: US 11,877,095 B2
(45) Date of Patent: Jan. 16, 2024

(54) SYSTEM AND METHOD FOR AUTOMATICALLY CONTROLLING A DISPLAY SYSTEM FOR A WORK VEHICLE

(71) Applicant: CNH Industrial America LLC, New Holland, PA (US)

(72) Inventors: Eric James Zieser, Clearwater, KS (US); Randy Joe Hageman, Danville, IA (US); Jeffrey Marc Stewart, Burlington, IA (US); Matthew D. Wagenbach, Burlington, IA (US); James Sutor, Galesburg, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/330,744

(22) Filed: May 26, 2021

(65) Prior Publication Data
US 2021/0377492 A1 Dec. 2, 2021

Related U.S. Application Data

(60) Provisional application No. 63/029,928, filed on May 26, 2020.

(51) Int. Cl.
H04N 7/18 (2006.01)
G06F 3/14 (2006.01)
(Continued)

(52) U.S. Cl.
CPC .............. *H04N 7/181* (2013.01); *B60K 35/00* (2013.01); *B60N 2/14* (2013.01); *E02F 9/166* (2013.01); *E02F 9/261* (2013.01); *G01B 21/22* (2013.01); *G06F 3/14* (2013.01); *H04N 23/695* (2023.01); *B60K 2370/152* (2019.05);
(Continued)

(58) Field of Classification Search
CPC ......... G06F 3/1431; G06F 3/14; H04N 7/181; H04N 5/23299; G01B 21/22; E02F 9/261; E02F 9/166; E02F 3/342; E02F 3/32; E02F 9/028; B60K 35/00; B60K 2370/171; B60K 2370/152; B60N 2/14; G09G 2380/06;
(Continued)

(56) References Cited

U.S. PATENT DOCUMENTS 9,217,240 B2 12/2015 Shibata
9,871,968 B2 1/2018 Husted et al.
(Continued)

*Primary Examiner* — Thai Q Tran
*Assistant Examiner* — Nienru Yang
(74) *Attorney, Agent, or Firm* — Peter K. Zacharias; Rickard K. DeMille; Rebecca L. Henkel

(57) ABSTRACT

A method for automatically controlling a display system for a work vehicle having a first implement supported at a first end of a chassis, a second implement supported at a second end of the chassis, and a chair that is selectively movable between a first position oriented toward the first end of the work vehicle and a second position oriented toward the second end of the work vehicle. The method may include receiving an input indicative of a position of the chair and an input indicative of an operating state of the work vehicle.

(Continued)

Additionally, the method may include controlling a display device to display image data from an imaging device associated with a first portion of a worksite or a second portion of the worksite based at least in part on the position of the chair and the operating state of the work vehicle.

16 Claims, 6 Drawing Sheets

(51) Int. Cl.
| | |
|---|---|
| *E02F 9/16* | (2006.01) |
| *E02F 9/26* | (2006.01) |
| *B60N 2/14* | (2006.01) |
| *G01B 21/22* | (2006.01) |
| *B60K 35/00* | (2006.01) |
| *H04N 23/695* | (2023.01) |
| *E02F 9/02* | (2006.01) |
| *E02F 3/32* | (2006.01) |
| *E02F 3/342* | (2006.01) |

(52) U.S. Cl.
CPC ............ *B60K 2370/171* (2019.05); *E02F 3/32* (2013.01); *E02F 3/342* (2013.01); *E02F 9/028* (2013.01)

(58) Field of Classification Search
CPC ........... G09G 2354/00; G09G 2360/04; G09G 2380/10
USPC .......................................................... 348/148
See application file for complete search history.

(56) References Cited

U.S. PATENT DOCUMENTS

| | | | |
|---|---|---|---|
| 10,106,072 B2 | 10/2018 | Liñan et al. | |
| 10,237,476 B2 | 3/2019 | Ali et al. | |
| 2006/0034535 A1 | 2/2006 | Koch et al. | |
| 2008/0127531 A1* | 6/2008 | Stanek | E02F 9/2004 |
| | | | 701/50 |
| 2014/0190046 A1* | 7/2014 | Shibata | E02F 9/26 |
| | | | 701/50 |
| 2017/0241104 A1 | 8/2017 | Farmer et al. | |
| 2018/0234626 A1* | 8/2018 | Ali | H04N 5/23238 |
| 2019/0249391 A1* | 8/2019 | Kikuchi | E02F 9/22 |

* cited by examiner

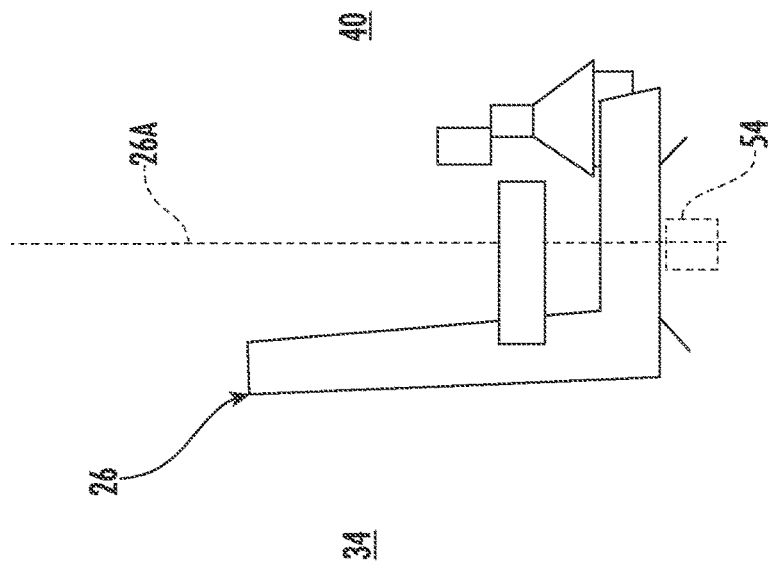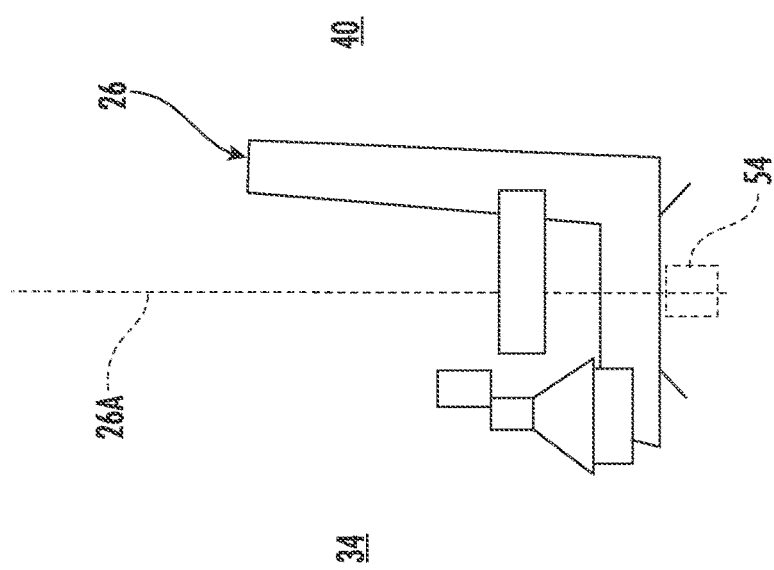

SYSTEM AND METHOD FOR AUTOMATICALLY CONTROLLING A DISPLAY SYSTEM FOR A WORK VEHICLE

FIELD OF THE INVENTION

The present disclosure relates generally to display systems for work vehicles and, more particularly, to systems and methods for automatically controlling a display system for a work vehicle based on a position of an operator chair of the work vehicle and an operating state of the work vehicle.

BACKGROUND OF THE INVENTION

A wide variety of work vehicles have been developed for various purposes. Certain work vehicles may include multiple implements for performing earthmoving operations. For instance, work vehicles such as backhoe loaders may include a loader at a front end of the vehicle and a backhoe at the rear end of the vehicle. Cabs, sometimes referred to as "operator environments," provide a central location to which controls and operator interfaces may be fed, and from which most or all of the vehicle and implement functions may be easily controlled. An operators' chair may be configured to rotate or otherwise move so that an operator may face the front end or the rear end of the vehicle. The large size and proportions of many work vehicles make it difficult or impossible for a single operator to keep visual contact with the entirety of an associated implement and/or work area during operation, even with such movable chair. For instance, one or more components of a backhoe, cab structure, or other components may block the operator's view of the work area.

As such, some work vehicles include one or more cameras or other imaging devices to provide views of the work vehicle's environment and components. However, switching between different views may be cumbersome to an operator. Therefore, further enhancements may still be made to improve the coordination of display systems during operation of work vehicles, such as vehicles including multiple articulable implements.

Accordingly, an improved system and method for automatically controlling a display system for a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for automatically controlling a display system for a work vehicle. The work vehicle includes a chassis extending between a first end and a second end, a first implement supported at the first end of the chassis, a second implement supported at the second end of the chassis, and a chair. The chair is selectively movable between a first position and a second position, where the chair is oriented toward the first end of the work vehicle in the first position and toward the second end of the work vehicle in the second position. The system includes a display device, at least one imaging device provided in operative association with the work vehicle, and a computing device communicatively coupled to the display device and the at least one imaging device. The at least one imaging device is configured to generate image data associated with a first portion of a worksite adjacent the first end of the work vehicle and a second portion of the worksite adjacent the second end of the work vehicle. The computing device is configured to receive an input indicative of a position of the chair, receive an input indicative of an operating state of the work vehicle, and control the display device to display image data from the at least one imaging device associated with the first portion or the second portion of the worksite based at least in part on the position of the chair and the operating state of the work vehicle.

In another aspect, the present subject matter is directed to a method for automatically controlling a display system for a work vehicle. The work vehicle has a chassis extending between a first end and a second end, a first implement supported at the first end of the chassis, a second implement supported at the second end of the chassis, and a chair. The chair is selectively movable between a first position and a second position, with the chair being oriented toward the first end of the work vehicle in the first position and toward the second end of the work vehicle in the second position. The method includes receiving, with one or more computing devices of a computing system, an input indicative of a position of the chair. The method further includes receiving, with the one or more computing devices, an input indicative of an operating state of the work vehicle. Additionally, the method includes controlling, with the one or more computing devices, a display device to display image data from at least one imaging device associated with a first portion of a worksite adjacent the first end of the work vehicle or a second portion of the worksite adjacent the second end of the work vehicle based at least in part on the position of the chair and the operating state of the work vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2A illustrates a side view of a chair assembly of a work vehicle, particularly illustrating the chair assembly in a forward-facing position in accordance with aspects of the present subject matter;

FIG. 2B illustrates a side view of a chair assembly of a work vehicle, particularly illustrating the chair assembly in a rear-facing position in accordance with aspects of the present subject matter;

Figure 1:
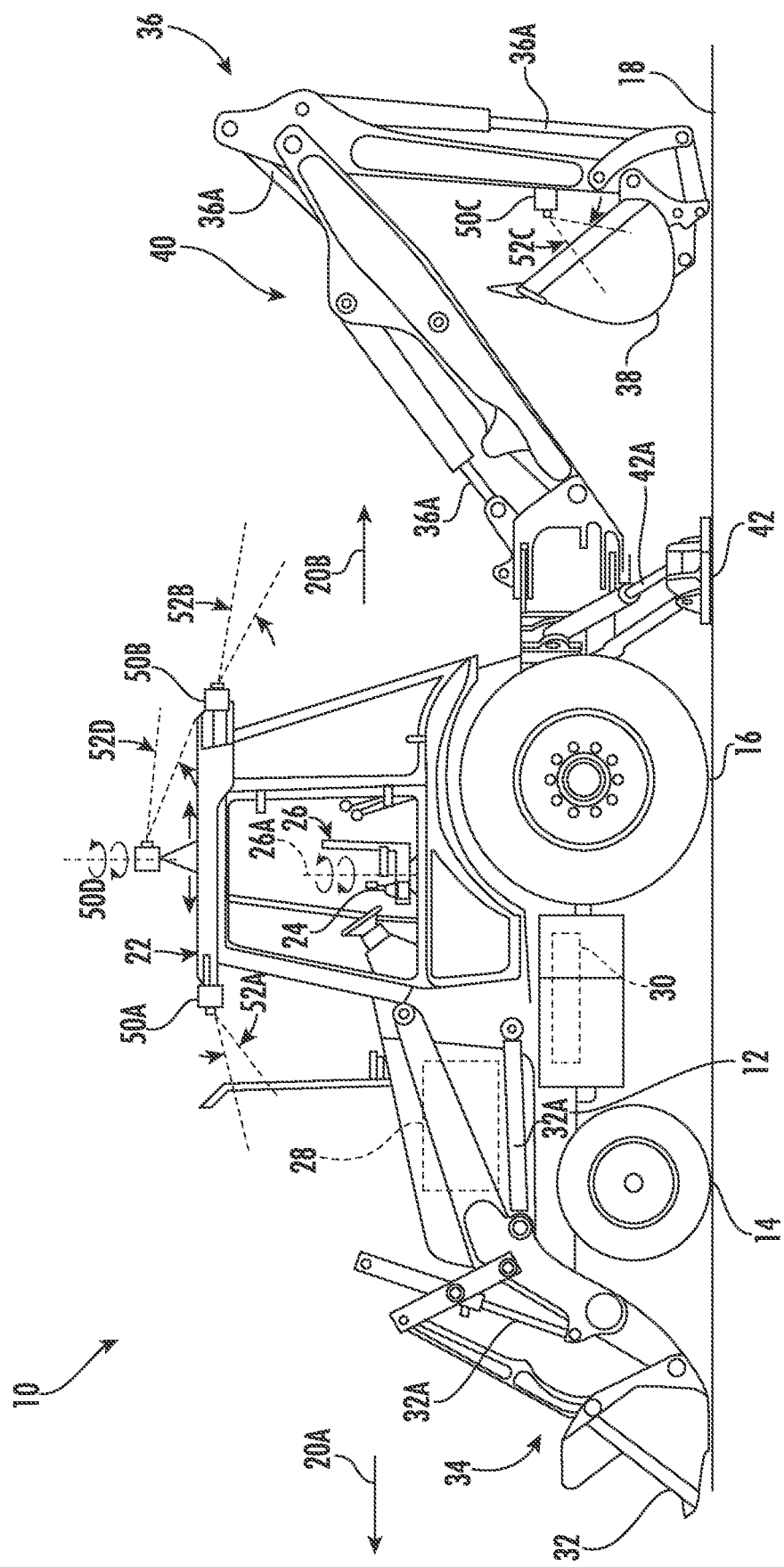
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for automatically controlling a display system for a work vehicle. Specifically, in several embodiments, a computing device of the disclosed system may be configured to receive an input indicative of whether a chair of a work vehicle is directed towards a first implement (e.g., a loader) at a front end of the vehicle or a second implement (e.g., a backhoe) at a rear end of the vehicle. The computing device may further be configured to receive an input indicative of an operating state of one or more components of the work vehicle. For instance, the computing device may be configured to receive inputs from a gear shift device, a turn-signal device, a stabilizing device, and/or a device for controlling the first or second implement, which is indicative of the operating state of the work vehicle. The computing device may be configured to control a display device to display a first portion of the worksite, generally towards the first implement, or a second portion of the worksite, generally towards the second implement, depending at least in part on the position of the chair assembly and the operating state of the work vehicle. As such, an operator has an improved view for operating the work vehicle in the associated operating mode, which improves safety and increases efficiency.

Referring now to the drawings, FIG. 1 illustrates a side view of one embodiment of a work vehicle in accordance with aspects of the present subject matter. As shown, the work vehicle 10 is configured as a backhoe loader. However, in other embodiments, the work vehicle 10 may be configured as any other suitable work vehicle known in the art, such as various other construction vehicles (e.g., earth-moving vehicles, loaders, and/or the like) and/or agricultural vehicles (e.g., agricultural tractors, harvesters, self-propelled sprayers, and/or the like).

As shown in FIG. 1, the work vehicle 10 may include a frame or chassis 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the vehicle 10 relative to a ground surface 18 and move the vehicle 10 along the ground surface 18 in either a forward direction of travel 20A or a rearward or reverse direction of travel 20B. However, in alternative embodiments, the front wheels 14 may be driven in addition to or in lieu of the rear wheels 16. Moreover, in further embodiments, the vehicle 10 may include track assemblies (not shown) in place of the front and/or rear wheels 14, 16. Additionally, an operator's cab 22 may be supported by a portion of the chassis 12 and may house one or more operator control devices 24 for permitting an operator to control the operation of the work vehicle 10. A chair assembly including an operators' chair 26 may also be positioned in the cab 22. As will be described below, the chair 26 may be movable, with the position of the chair 26 being used in part to determine a display view of a display device for the vehicle 10.

Further, the work vehicle 10 may include one or more powertrain components for adjusting the speed and/or direction at which the vehicle 10 moves. Specifically, in several embodiments, the work vehicle 10 may include an engine 28 and a transmission 30 mounted on the frame 12. The transmission 30 may be operably coupled to the engine 28 and may provide variably adjusted gear ratios for transferring the power generated by the engine 28 to the driven wheels 16. For example, increasing the power output by the engine 28 and/or shifting the transmission 30 into a higher forward gear may increase the speed at which the vehicle 10 moves in the forward direction of travel 20A. Conversely, decreasing the power output by the engine 28 and/or shifting the transmission 30 into a lower forward gear may decrease the speed at which the vehicle 10 moves in the forward direction of travel 20A. Further, shifting the transmission 30 into a reverse gear causes the vehicle 10 to move in the rearward or reverse direction of travel 20B, with increasing and/or decreasing the power output by the engine 28 causing a respective increase or decrease in the speed of travel in the reverse direction 20B. Additionally, shifting the transmission 30 into a parking gear or neutral gear prevents the vehicle 10 from moving when the engine 28 is supplying power. Thus, as will be described in greater detail below, the operator control devices 24 includes one or more gear shift devices 24A (FIG. 3) configured for changing between the forward, reverse, park, and/or neutral gear ratios of the transmission 30.

Moreover, the work vehicle 10 may include one or more work implements. Each work implement may, in turn, be configured to perform a work operation, such as a construction operation (e.g., moving soil, building materials, debris, and/or the like) and/or an agricultural operation (e.g., harvesting, spraying, and/or the like). For example, in the illustrated embodiment, the vehicle 10 includes a loader 32 positioned adjacent to a forward end 34 of the vehicle 10. The loader 32 may be configured to transport or otherwise convey a volume of soil or other material (e.g., building materials and debris) relative to the ground surface 18. The loader 32 is actuatable by actuation of loader actuators 32A. The operator control devices 24 may thus, include one or more loader control devices 24B (FIG. 3) for controlling the actuation of the loader actuators 32A. Furthermore, in the illustrated embodiment, work vehicle 10 includes a backhoe 36 having a bucket 38 at or adjacent to an aft or rear end 40 of the vehicle 10. The backhoe 36 may, in turn, be configured to dig or otherwise excavate a volume of soil or other debris (e.g., building materials and debris). The backhoe 36 is actuatable by actuation of backhoe actuators 36A. The operator control devices 24 may thus, include one or more backhoe control devices 24C (FIG. 3) for controlling the actuation of the actuators 36A.

Furthermore, as shown in FIG. 1, the work vehicle 10 may include a pair of stabilizer legs 42 (one is shown) positioned adjacent to the driven wheels 16. The stabilizer legs 42 may, in turn, be configured to support the weight of the vehicle 10 and the contents of bucket 38 when performing a digging or excavation operation with one of the implements. Furthermore, the stabilizer legs 42 may be pivotably coupled to the frame 12. In this regard, the stabilizer legs 42 may be movable by leg actuators 42A between a lowered or stabilizing position in which the legs 42 contact the ground surface 18 to support the weight of the vehicle 10 and a raised or travel position in which the legs 42 are lifted off the ground surface 18 to allow the vehicle 10 to move (e.g., in the direction of travel 20A, 20B). The operator control devices 24 may thus, include one or more stabilizer control devices 24D (FIG. 3) for controlling the actuation of the leg actuators 42A.

It should be appreciated that the implements of the work vehicle 10 may further be used as stabilizing devices for stabilizing or supporting the weight of the vehicle 10 during an earthmoving operation. For instance, when the backhoe 36 is being used to perform an earthmoving operation, the loader 32 may be lowered towards the ground to counterbalance the loaded backhoe 36. Similarly, when the loader 32 is being used to perform an earthmoving operation, the backhoe 36 may be in a stabilizing position (with the bucket 38 lowered towards the ground) to counterbalance the loader 32.

Referring still to FIG. 1, in accordance with aspects of the present subject matter, the work vehicle 10 may additionally include one or more imaging devices 50 configured to generate image data of the worksite and/or a portion(s) of the work vehicle 10. For instance, the imaging device(s) 50 may be supported on the operator's cab 22 and/or the backhoe 36 such that a field of view of the imaging device(s) may be directed towards at least a portion of the worksite and/or work vehicle 10 proximate the forward end 34 of the vehicle 10 and/or proximate the rear end 40 of the vehicle 10.

In some embodiments, separate imaging devices 50 may be used to generate image data of a portion of the worksite or the work vehicle 10 proximate the forward end 34 of the vehicle 10 and image data of a portion of the worksite or the work vehicle 10 proximate the rear end 40 of the vehicle 10. For example, at least one forward imaging device 50A may be positioned at a forward end of the cab 22 closest to the loader 32 such that a field of view 52A of the imaging device(s) 50A is directable towards a forward portion of the worksite and/or a portion of the loader 32. Similarly, at least one rearward imaging device 50B may be positioned at a rear end of the cab 22 closest to the backhoe 36 such that a field of view 52B of the imaging device(s) 50B is directable towards a rearward portion of the worksite and/or a portion of the backhoe. Additionally, or alternatively, at least one implement imaging device 50C may be supported on the backhoe 36 such that a field of view 52C of the imaging device(s) 50C is directable towards a portion of the worksite forward of the bucket 38 and/or a portion of the bucket 38.

In some embodiments, the imaging device(s) 50 may be used to generate both image data of a portion of the worksite or the work vehicle 10 proximate the forward end 34 of the vehicle 10 and image data of a portion of the worksite or the work vehicle 10 proximate the rear end 40 of the vehicle 10. For instance, at least one imaging device 50D may be supported on the cab 22 such that a field of view 52D of the imaging device(s) 50D is directable towards both the portion of the worksite or the work vehicle 10 proximate the forward end 34 of the vehicle 10 and the portion of the worksite or the work vehicle 10 proximate the rear end 40 of the vehicle 10. For example, the imaging device(s) 50D may be movable (e.g., rotatable, translatable, etc.) such that the field of view 52D may be selectively directed towards either the forward end 34 or the rear end 40 of the vehicle 10.

The imaging devices 50 may correspond to any suitable devices configured to detect or capture image or image-like data indicative of the portion of the worksite and/or portion of the work vehicle 10 (e.g., implements 32, 36). For example, the imaging devices 50 may correspond to any suitable camera(s), such as a single-spectrum camera or a multi-spectrum camera configured to capture images, for example in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the imaging device(s) 50 may correspond to any other suitable image capture device(s) and/or other vision sensor(s), such as radio detection and ranging (RADAR) sensors and/or light detection and ranging (LIDAR) sensors.

It should be appreciated that while four imaging devices 50 are illustrated as being associated with the work vehicle 10, any suitable number of imaging devices 50 may instead be associated with the work vehicle 10. For instance, one, two, three, five, or more imaging devices 50 may instead be used. It should further be appreciated that while the imaging devices 50 are shown as only being positioned at the top of the cab 22 (e.g., the imaging devices 50A, 50B, 50D) and/or on the backhoe 36 (e.g., the imaging device 50C), the imaging devices 50 may be positioned at any other suitable location on the work vehicle 10, such as on any other implement (e.g., on the loader 32).

Additionally, it should be further appreciated that the configuration of the work vehicle 10 described above and shown in FIG. 1 is provided only to place the present subject matter in an exemplary field of use. Thus, it should be appreciated that the present subject matter may be readily adaptable to any manner of vehicle configuration any other suitable work implement(s), such as blades, rippers, harvesting implements (e.g., headers), spray booms, and/or the like.

Referring now to FIGS. 2A and 2B, differing views of a chair assembly 26 are illustrated in accordance with aspects of the present subject matter. Specifically, FIG. 2A illustrates a side view of one embodiment of the chair assembly 26 in a forward-facing direction and FIG. 2B illustrates a side view of one embodiment of the chair assembly 26 in a rear-facing direction. As indicated above, the operator chair 26 may be movable. More particularly, the chair 26 may be movable between a forward-facing position where the chair 26 faces the forward end 36 of the machine 10 and a rear-facing position where the chair 26 faces the rear end 40 of the machine 10. As such, an operator may move the chair 26 between the forward-facing and rear-facing positions to face the control devices 24 at the forward end 34 or the rear end 40 of the cab 22 for controlling different components of the vehicle 10.

In one embodiment, the chair 26 is rotatable about a chair axis 26A between a first angular position (FIG. 2A) associated with the chair 26 being in the forward-facing position and a second angular position (FIG. 2B) associated with the chair 26 being in the rear-facing position. However, it should be appreciated that the chair 26 may be configured to move in any other suitable way to allow the operator to be forward-facing or rear-facing, such as sliding, rotating around a horizontal axis, and/or the like. It should further be appreciated that in some embodiments only part of the chair 26 is moved to allow the operator to be forward-facing or rear-facing. For instance, a backrest of the chair 26 may slide relative to a seat of the chair 26 to change between the forward-facing or rear-facing positions.

As further indicated above, the position of the chair 26 may be used in part to determine display view of a display device for assisting an operator during operation of the vehicle 10. As such, in accordance with aspects of the present subject matter, the chair assembly further includes one or more chair position sensor(s) 54 configured to monitor the position of the chair 26, as shown in FIGS. 2A and 2B. Particularly, in embodiments where the chair 26 rotates, the position sensor(s) 54 may be configured to monitor the angular position of the chair. However, as indicated above, the chair 26 may move in any other suitable way to change between the desired orientations. As such, the chair position sensor(s) 54 may correspond to any suitable position sensor. For instance, the chair position sensor(s) 54 may include one or more rotational sensors, on/off sensors, linear encoders, and/or the like.

Figure 3:
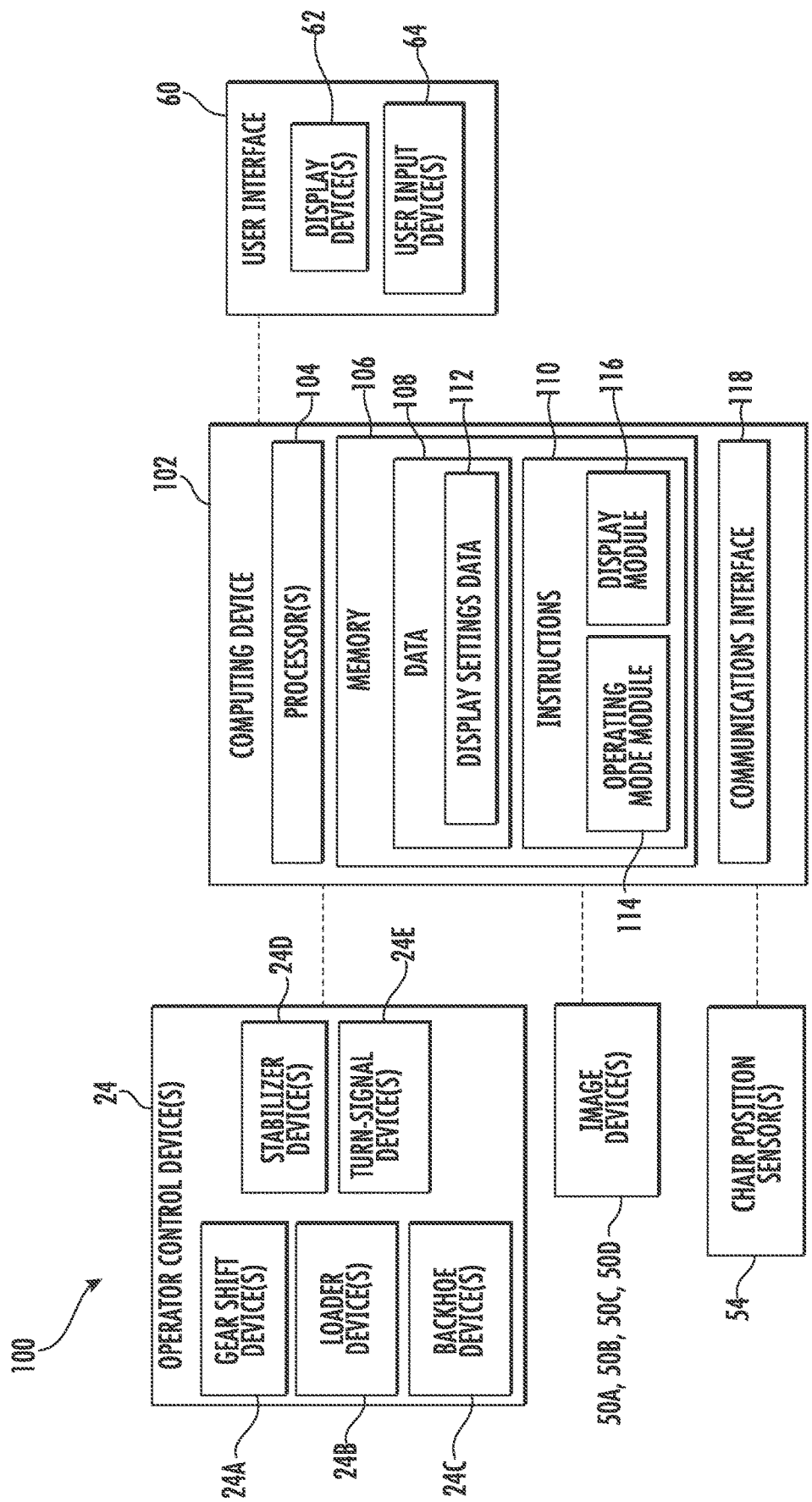
FIG. 3 illustrates a schematic view of a system for automatically controlling a display system for a work vehicle in accordance with aspects of the present subject matter.

Referring now to FIG. 3, one embodiment of a system 100 for automatically controlling a display system for a work vehicle is illustrated in accordance with aspects of the present subject matter. In general, the system 100 shown in FIG. 3 will be described herein with reference to the work vehicle 10 described above with reference to FIGS. 1 and 2. However, it should be appreciated by those of ordinary skill in the art that the disclosed system 100 may generally be utilized with work vehicles having any other suitable vehicle configuration. Additionally, it should be appreciated that the communicative links or electrical couplings of the system 100 shown in FIG. 3 are indicated by dashed lines.

In several embodiments, the system 100 may include a computing device 102 and various other components configured to be communicatively coupled to and/or controlled by the computing device 102, such as one or more operator input devices 24, one or more imaging devices 50, and one or more chair position sensors 54. Additionally, the computing device 102 may be communicatively coupled to a user interface 60 to allow the computing device 102 to control the operation of the user interface 60 and/or receive inputs from an operator via the user interface 60. In general, the user interface 60 may be correspond to any suitable output device(s) 62 that allow the computing device 102 to control the operation of the user interface 60 and/or input devices 64 that allow the computing device 102 to receive inputs from an operator via the user interface 60, such as a display device (e.g., a touch screen display), a keyboard, joystick, buttons, knobs, switches, and/or combinations thereof.

As will be described in greater detail below, the computing device 102 may be configured to automatically control the operation of the user interface 60 based on an operating mode of the work vehicle 10 to provide a view of the operating environment of the work vehicle 10 according to one or more predetermined settings. The operating mode of the work vehicle 10 may generally be determined based at least in part on a position of the chair 26 and an operating state of one or more components of the work vehicle 10. The operating state of the component(s) may be determined based on inputs received from one or more operator control device(s) 24, as will be described in greater detail below. Thus, upon identifying the position of the chair 26 and determining the operating state of the work vehicle 10, the computing device 102 may control the operation of the user interface 60 to provide the most beneficial view of the operating environment of the work vehicle 10 to an operator.

In general, the computing device 102 may correspond to any suitable processor-based device(s), such as a given controller or computing device or any combination of controllers or computing devices. Thus, as shown in FIG. 3, the computing device 102 may generally include one or more processor(s) 104 and associated memory device(s) 106 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 106 of the computing device 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store computer-readable instructions that, when implemented by the processor(s) 104, configure the computing device 102 to perform various computer-implemented functions, such as one or more aspects of the control algorithm or routine 300 described below with reference to FIGS. 4A and 4B and one or more aspects of the method 400 described below with reference to FIG. 5.

It should be appreciated that the computing device 102 may correspond to an existing computing system for the work vehicle 10 or may correspond to a separate processing device. For instance, in one embodiment, the computing device 102 may form all or part of a separate plug-in module that may be installed in operative association with the work vehicle 10 to allow for the disclosed system and method to be implemented without requiring additional software to be uploaded onto existing control devices of the work vehicle 10.

In several embodiments, the data 108 may be stored in one or more databases. For instance, the memory 106 may include a display settings database 112 for storing one or more display settings for the display device 62 of the user interface 60 for each of the various operating modes of the work vehicle 10. As will be described below, each operating mode may be determined based on at least the position of the chair 26 and the operating state of one or more components of the vehicle 10.

For example, in one embodiment, one or more display settings may be stored within the database 112 that prescribe a rearward-facing display view when the vehicle 10 is in a reverse-travel operating mode (e.g., for traveling in direction 20B in FIG. 1) associated with the chair 26 being in a forward-facing position (FIG. 2A) and the transmission 30 being in a reverse gear ratio. Similarly, one or more display settings may be stored within the database 112 that prescribe a rearward-facing display view when the vehicle 10 is in a direction-change operating mode (e.g., for turning while traveling in direction 20A in FIG. 1) associated with the chair 26 being in a forward-facing position (FIG. 2A) and the transmission 30 being in a forward gear ratio and the turn-signal being "on." Further, one or more display settings may be stored within the database 112 that prescribe a forward-facing display view when the vehicle is in a loader operating mode (e.g., for operating the loader 32 in FIG. 1) associated with the chair 26 being in a forward-facing position (FIG. 2A) and the loader is being moved. Moreover, one or more display settings may be stored within the database 112 that prescribe a rearward-facing display view when the work vehicle 10 is in a backhoe operating mode (e.g., for operating backhoe 36 in FIG. 1) associated with the chair 26 being in a rear-facing position (FIG. 2B) and the backhoe is being moved while the stabilizer legs are extended. Additionally, one or more display settings may be stored within the database 112 that prescribe a forward-facing display view when the work vehicle 10 is in an indirect-travel operating mode (e.g., for traveling in the forward direction 20A in FIG. 1 via operation of the backhoe 36) associated with the chair 26 being in a rear-facing position (FIG. 2B) and the backhoe moving while the stabilizer element(s) (e.g., loader and/or stabilizer legs) is in a raised or transport position.

In some embodiments, the different display settings stored within the database 112 may further indicate whether the image data from the imaging device(s) 50 needs to be mirrored, flipped, or inverted. For instance, for the reverse-travel operating mode or the direction-change operating mode, the images generated from the image data from the rearwardly-directed imaging device(s) 50 may be mirrored to match the operator's left and right orientation. Similarly, for the indirect-travel operating mode, the images generated from the image data from the forwardly-directed imaging device(s) 50 may be mirrored to match the operator's left and right orientation.

Referring still to FIG. 3, in several embodiments, the instructions 110 stored in the memory 106 may be executed by the processor(s) 104 to implement an operating mode detection module 114. In general, the operating mode detection module 114 may be configured to detect changes in the operating mode of the work vehicle based on inputs received by the computing device 102. For instance, in several embodiments, the operating mode detection module 114 may be configured to detect changes in the operating mode of the work vehicle based on inputs received from the chair position sensor(s) 54 and the operator control device(s) 24. For example, the chair position sensor(s) 54 may provide an input(s) indicating that the chair 26 is moved between the forward-facing position (FIG. 2A) and the rear-facing position (FIG. 2B). Alternatively, or additionally, the operator control device(s) 24 may provide input(s) indicating changes in the operating state of a component(s) of the work vehicle 10. Based on the position of the chair and the operating state of the component(s) of the vehicle 10, the operating mode detection module 114 may determine the operating mode (or a change in the operating mode) of the work vehicle 10. For instance, the operating mode detection module 114 may be configured to carry out one or more aspects of the control algorithm or routine 300 described below with reference to FIGS. 4A and 4B to determine the operating mode (or a change in the operating mode) of the work vehicle 10.

In particular, the operator control device(s) 24 may include at least one of the gear shift control device(s) 24A, the loader control device(s) 24B, the backhoe control device(s) 24C, the stabilizer control device(s) 24D, or any other control devices, such as a turn-signal control device(s) 24E for controlling a turn-signal of the work vehicle. In general, each of the operator control devices 24 may be configured to convert the operator input(s) (e.g., the movement of the operator control device(s) 24) into a signal (e.g., an electric or wireless signal) or other suitable type of data that a computing device can interpret. Thereafter, the operator control device(s) 24 may be configured to transmit the signal to the computing device for controlling the operation of the associated component and/or determining the operating state of the vehicle components.

In some embodiments, the control device(s) 24 may be moved or manipulated by the operator in a discrete manner corresponding to known settings or operational states of the vehicle components. For example, the gear shift control device 24A may be movable between discrete positions corresponding to different gear ratios as indicated above. Similarly, the stabilizer control device(s) 24D may be moved between a stabilizing position indicative of the associated stabilizer leg(s) 42 being in a traveling position raised away from the ground and a stabilizing position indicative of the associated stabilizer leg(s) 42 being in an extended position (e.g., pivoted away from the traveling position towards the ground). The turn-signal control device(s) 24E may similarly be movable between discrete positions corresponding to a left-turn indicating position, a right-turn indicating position, or an off position, for example. As such, movement of the control device by an operator between the discrete positions may be converted by the respective control device 24A, 24D, 24E into a signal that the computing device may interpret to determine the gear ratio in which the transmission 30 (FIG. 1) is operating, the position of the stabilizer leg(s) 42, and/or the direction in which the vehicle 10 is intended to move which is indicative of the operating mode of the vehicle 10 when coupled with the inputs from the sensor(s) 54 indicative of the position of the chair 26.

In some embodiments, the control device(s) 24 may be moved in a continuous manner instead of a discrete manner. For instance, the loader control device(s) 24B and the backhoe control devices 24C may be moved such that the implement 32, 36 moves proportionally. As such, movement of the continuous input devices may be converted by the control device(s) 24B, 24C into a signal that the computing device may interpret to determine the movements of the implement 32, 36 which may also be indicative of the operating mode of the vehicle 10 when coupled with the inputs from the sensor(s) 54 indicative of the position of the chair 26.

It should be appreciated that while certain control devices 24A, 24D, 24E are described as being associated with discrete movements, the control devices 24A, 24D, 24E may instead be associated with continuous movements. Similarly, while certain control devices 24B, 24C are described as being associated with continuous movements, the control devices 24B, 24C may instead be associated with discrete movements.

It should additionally be appreciated that the control device(s) 24 may correspond to any suitable device(s) or structure(s) configured to receive operator inputs for controlling the operation of the associated component of the vehicle 10 besides the ones described. For instance, the control device(s) 24 may correspond to a touch screen display, a keyboard, joystick, buttons, knobs, switches, and/or combinations thereof.

Moreover, as shown in FIG. 3, the instructions 110 stored in the memory 106 may also be executed by the processor(s) 104 to implement a display control module 116. In general, the display control module 116 may be configured to control the operation of the user interface 60 (e.g., display device 62) to provide the desired display view configuration based on the stored display setting corresponding to the current operating mode of the vehicle. Specifically, in several embodiments, when the operating mode detection module 114 detects a change in the operating mode of the work vehicle, the display control module 116 may be configured to access the display settings database 112 to determine the appropriate display view setting to be applied based on the new operating mode of the work vehicle. The display control module 116 may then control the user interface 60, such as by controlling the display device 62 of the interface 60 to display either a forwardly oriented view of the vehicle environment from the imaging devices (e.g., imaging device(s) 50A, 50D) or a rearwardly oriented view of the vehicle environment from the imaging devices (e.g., imaging device(s) 50B, 50C, 50D), based on the selected display view setting. The display control module 116 may, thus, be configured to carry out one or more aspects of the control algorithm or routine 300 described below with reference to FIGS. 4A and 4B to determine the appropriate display view setting to be applied based on the operating mode of the work vehicle and control the user interface 60, such as by controlling the display device 62 to display the selected display view.

It should be appreciated that the display control module 116 may further be configured to control the operation of the imaging devices to be oriented according to the selected display view setting. For instance, in embodiments with a movable or actuatable imaging device(s) (e.g., imaging device 50D), the display control module 116 may control the actuators (not shown) provided in operative association with such imaging device(s) to be oriented towards the desired direction, if necessary.

It should also be appreciated that the display control module 116 may also be configured to control the operation of the user interface 60 based on one or more override inputs received from an operator regarding the display view. For instance, the display control module 116 may be configured to receive an input from an operator (e.g., via the input device 64 associated with the user interface 60) indicative of changing or altering the display view from the display view setting selected from the display settings database 112. For instance, the display control module 116 may be configured to receive an input indicative of mirroring or inverting the display view from the selected display view setting. Further, the display control module 116 may be configured to receive an input indicative of changing from the selected forward-facing display view to the rear-facing display view, or vice-versa.

Additionally, as shown in FIG. 3, the computing device 102 may also include a communications interface 118 to provide a means for the computing device 102 to communicate with any of the various other system components described herein. For instance, one or more communicative links or interfaces (e.g., one or more data buses) may be provided between the communications interface 118 and the operator control device(s) 24, the imaging device(s) 50, the chair position sensor(s) 54, and the user input device(s) 64 to allow the computing device 102 receive inputs therefrom. Similarly, one or more communicative links or interfaces (e.g., one or more data buses) may be provided between the communications interface 118 and the user interface 60 (e.g., the display device(s) 62), and in some embodiments, the imaging device actuator(s) (not shown) to allow control signals from the computing device 102 to be transmitted to such devices.

Figure 4A:
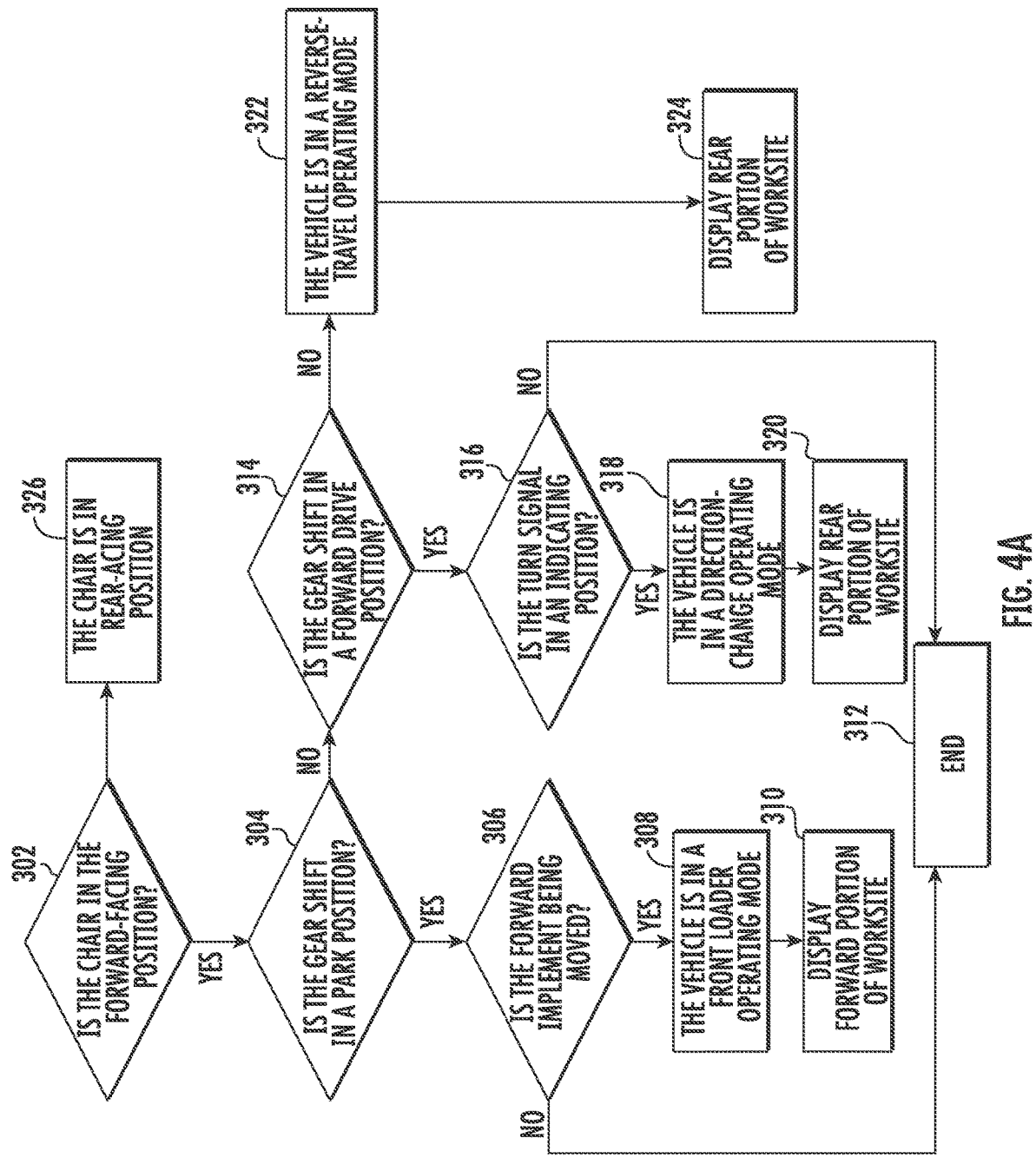
FIGS. 4A and 4B illustrate flow diagrams of one embodiment of a control algorithm for automatically controlling a display system for a work vehicle in accordance with aspects of the present subject matter.
Figure 4B:
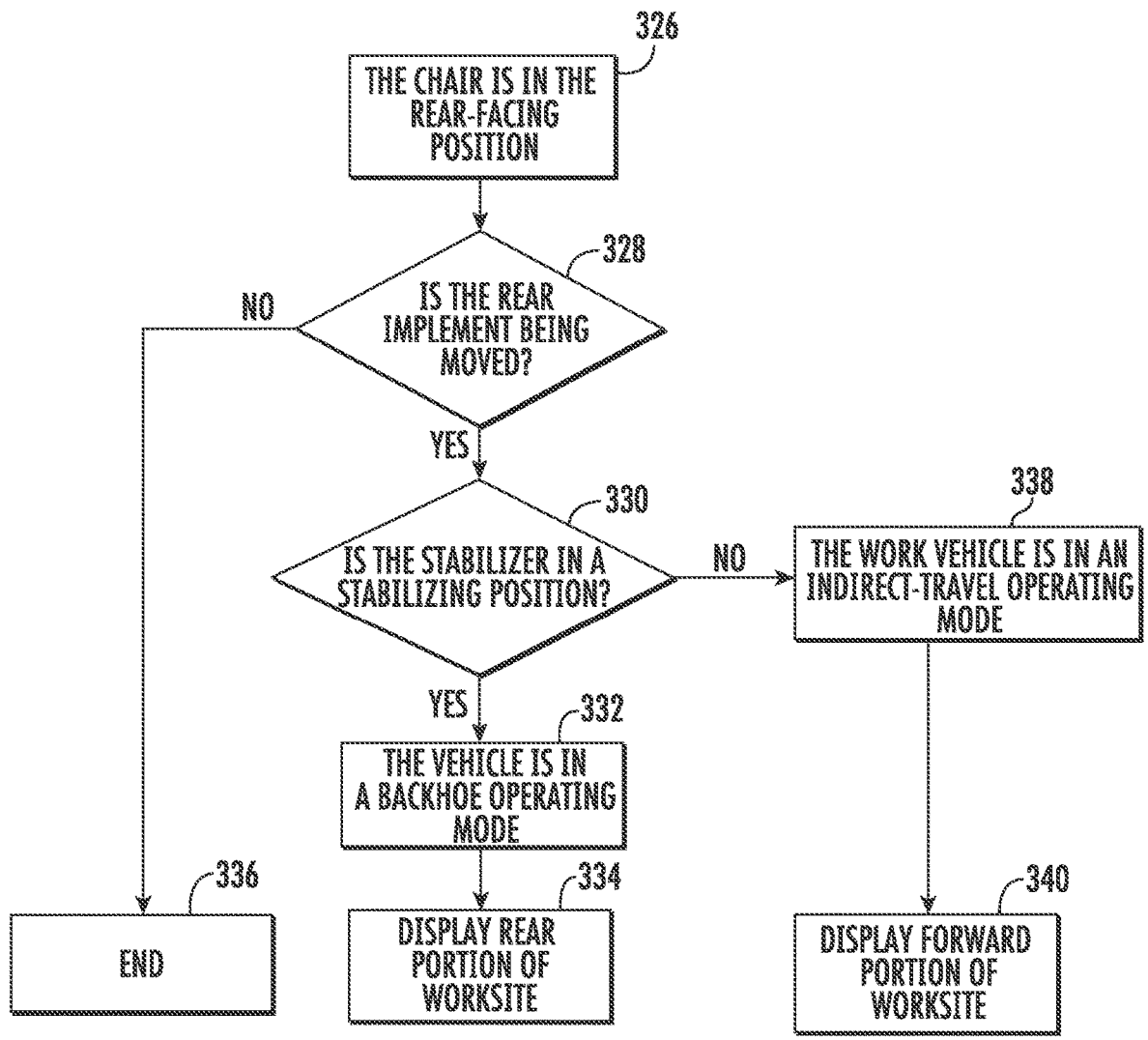

Referring now to FIGS. 4A and 4B, a flow diagram of one embodiment of a control algorithm 300 that may be executed when automatically controlling a display system for a work vehicle is illustrated in accordance with aspects of the present subject matter. In general, the control algorithm 300 will be described herein as being implemented by the computing device 102 of system 100 described above with reference to FIG. 3. However, it should be appreciated that the various processes described below may alternatively be implemented by another computing device or any combination of computing devices. In addition, although FIGS. 4A and 4B depict control steps or functions performed in a particular order for purposes of illustration, the routines discussed herein are not limited to any particular order or arrangement. One of ordinary skill in the art, using the disclosures provided herein, will appreciate that the various steps or functions of the algorithms disclosed herein can be omitted, rearranged, combined, and/or adapted in various ways without deviating from the scope of the present subject matter.

Starting in FIG. 4A, at (302), the computing device 102 may be configured to assess whether the chair 26 is in the forward-facing position. More particularly, the computing device 102 may be configured to receive an input from the chair position sensor(s) 54 indicative of whether the chair 26 is in the forward-facing position (FIG. 2A) or the rear-facing position (FIG. 2B). In embodiments where the chair 26 is rotatable between such forward and rear facing positions, the input may be an angular position of the chair 26 corresponding to either the forward or rear facing position.

In the event that the input from the sensor(s) 54 corresponds to the chair being in the forward-facing position, the computing device 102 may then be configured to assess, at (304), whether the gear shift device 24A is in a park position. More particularly, the computing device 102 may be configured to receive an input from the gear shift control device(s) 24A indicating which gear ratio of the transmission 30 is selected, as described above.

If the input from the gear shift control device(s) 24A indicates that the vehicle is in park, the computing device 102 may then be configured to determine whether the forward implement (e.g., loader 32) is being moved at (306). More particularly, the computing device 102 may be configured to receive an input from the forward implement control device(s) (e.g., loader control device(s) 24B) when the forward implement is being moved. If the forward implement is being moved at (306), it is determined that the work vehicle 10 is operating in a forward implement operating mode (e.g. loader operating mode) at (308). Thereafter, at (310), the computing device 102 may control the operation of the display device 62 to display the forward portion of the worksite environment (e.g., the portion of the worksite forward of the vehicle 10 and/or a portion of the forward implement 32). Alternatively, if the forward implement is not being moved at (306), the control algorithm ends at (312) such that the computing device 102 does not control the display device 62 of the user interface 60 to change to a particular view.

If the input from the gear shift control device 24A instead indicates that the vehicle is not in park at (304), then the computing device 102 may be configured at (314) to determine whether the gear shift device 24A is in a forward drive position. Again, the computing device 102 may be configured to receive an input from the gear shift control device 24A indicating which gear ratio of the transmission 30 is selected.

If the input from the gear shift control device 24A indicates that a forward gear ratio is selected at (314), the computing device 102 may then be configured to determine whether the turn-signal control device 24E is in an indicating or "on" position at (316). More particularly, the computing device 102 may be configured to receive an input from the turn-signal control device 24E associated with turning on a left-turn indicator, a right-turn indicator, or neither the left or right turn indicators, which is indicative of whether the vehicle 10 is being or is intended to be turned while moving in the forward direction 20A. If the turn-signal control device 24E is in an indicating or "on" position at (316), the computing device 102 determines that the vehicle 10 is in a direction-change operating mode at (318). The computing device 102 may then, at (320), control the operation of the display device 62 to display the rear portion of the worksite environment (e.g., the portion of the worksite rearward of the vehicle 10 and/or a portion of the rearward implement 36). Alternatively, if the turn signal is not in an indicating position at (316), the control algorithm ends at (312) such that the computing device 102 does not control the display device 62 of the user interface 60 to change to a particular view.

If the input from the gear shift control device 24A instead indicates that a forward gear ratio is not selected at (314), then the computing device 102 may be configured at (322) to determine that the gear shift device 24A is in a reverse gear position corresponding to the vehicle being in a reverse-travel operating mode. The computing device 102 may then, at (324), control the operation of the display device 62 to display the rear portion of the worksite environment (e.g., the portion of the worksite rearward of the vehicle 10 and/or a portion of the rearward implement 36).

In the event that the input from the sensor(s) 54 does not correspond to the chair being in the forward-facing position at (302), the computing device 102 may then be configured to determine, at (326), that the chair is in the rear-facing position. As shown in FIG. 4B, the computing device 102 may then be configured to determine whether the rear implement is being moved at (328). More particularly, the computing device 102 may be configured to receive an input from the rear implement control device(s) (e.g., the backhoe control device(s) 24C) indicating when the rear implement (e.g., backhoe 36) is being moved. If the rear implement is being moved at (328), the computing device 102 may then be configured to determine whether the stabilizer control device(s) is in a stabilizing position at (330).

More particularly, the computing device 102 may be configured to receive an input from the stabilizer control device(s) 24D and/or the loader control device(s) 24B associated with the work vehicle being in a transport position or in a stabilizing position. In particular, if either or both of the loader 32 and the stabilizer legs 42 are in contact with the ground (e.g., moved out of a transport position), the vehicle 10 is stabilized such that it is not intended to move while performing an earthmoving operation with the rearward implement (e.g., backhoe 36). If the stabilizer device(s) 32, 42 is determined to be in the stabilizing position at (330), the computing device 102 may then determine that the vehicle 10 is in a backhoe operating mode at (332). The computing device 102 may then, at (334), control the operation of the display device 62 to display the rear portion of the worksite environment (e.g., the portion of the worksite rearward of the vehicle 10 and/or a portion of the rearward implement 36).

However, if the stabilizer device(s) 32, 42 is instead determined to be in the transport position at (330), the computing device 102 may then determine that the vehicle 10 is in an indirect-travel operating mode at (338), where the rear implement is used to push the vehicle 10 in the forward direction 20A, which is generally faster than turning the chair 26 to the forward-facing position and activating the drive elements of the vehicle 10 when performing trenching operations, for example. The computing device 102 may then, at (340), control the operation of the display device 62 to display the forward portion of the worksite environment (e.g., the portion of the worksite forward of the vehicle 10 and/or a portion of the forward implement 32).

Additionally, in the event that the rear implement is not being moved at (328), the control algorithm ends at (336) such that the computing device 102 does not control the display device 62 of the user interface 60 to change to a particular view.

Figure 5:
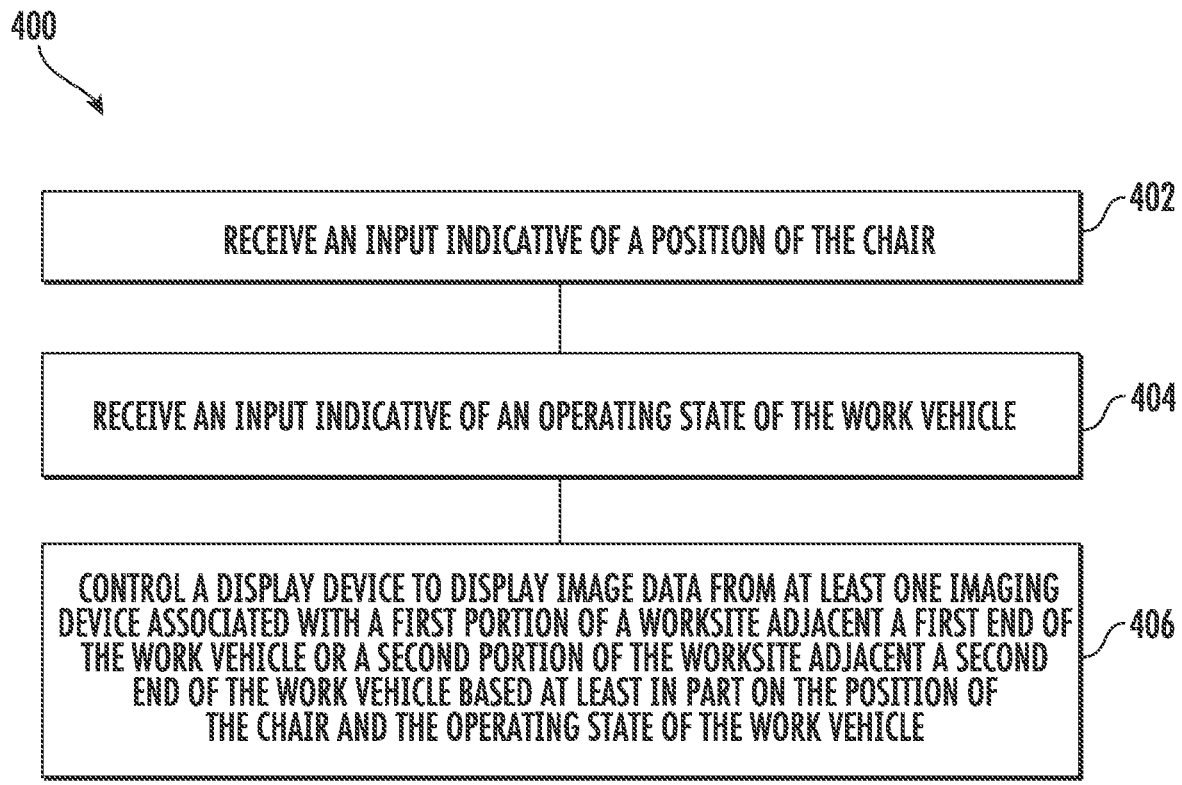
FIG. 5 illustrates a method for automatically controlling a display system for a work vehicle in accordance with aspects of the present subject matter.

Referring now to FIG. 5, a flow diagram of one embodiment of a method 400 for automatically controlling a display system for a work vehicle is illustrated in accordance with aspects of the present subject matter. In general, the method 400 will be described herein with reference to the work vehicle 10 shown in FIGS. 1 and 2, as well as the various system components shown in FIG. 3. However, it should be appreciated that the disclosed method 400 may be implemented with work vehicles having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 may include receiving an input indicative of a position of the chair. For instance, as indicated above, the computing device 102 may receive an input from the chair position sensor(s) 54 indicative of the chair 26 being in the first position (FIG. 2A) or in the second position (FIG. 2B).

Further, at (404), the method may include receiving an input indicative of an operating state of the work vehicle. For example, as discussed above, the computing device 102 may receive an input from one or more of the operator control device(s) 24 indicative of the operating state of the associated component(s) of the work vehicle 10. For instance, the computing device 102 may receive an input from one or more of the gear shift control device(s) 24A indicative of the operating state of the transmission 28, the loader control device(s) 24B indicative of the operating state of the loader 32, the backhoe control device(s) 24C indicative of the operating state of the backhoe 36, the stabilizer control device(s) 24D indicative of the operating state of the stabilizer leg(s) 42, and the turn-signal control device(s) 24E indicative of the operating state of the associated turn-signal(s).

Additionally, at (406), the method may include controlling a display device to display image data from at least one imaging device associated with a first portion of a worksite adjacent the first end of the work vehicle or a second portion of the worksite adjacent the second end of the work vehicle based at least in part on the position of the chair and the operating state of the work vehicle. For instance, as discussed above, the computing device 102 may control the display device(s) 62 of the user interface 60 to display image data from the imaging device(s) 50 corresponding to the portion of the worksite adjacent the first end 34 of the vehicle 10 or the portion of the worksite adjacent the second end 40 of the vehicle 10 based at least in part on the position of the chair 26 and the operating state of the work vehicle 10.

It is to be understood that the steps of the method 400 are performed by the computing system 100 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 100 described herein, such as the method 400, is implemented in software code or instructions which are tangibly stored on a tangible computer readable medium. The computing system 100 loads the software code or instructions via a direct interface with the computer readable medium or via a wired and/or wireless network. Upon loading and executing such software code or instructions by the computing system 100, the computing system 100 may perform any of the functionality of the computing system 100 described herein, including any steps of the method 400 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for automatically controlling a display system for a work vehicle, the work vehicle comprising a chassis extending between a first end and a second end, a first implement supported at the first end of the chassis, a second implement supported at the second end of the chassis, and a chair, the chair being selectively movable between a first position and a second position, the chair being oriented toward the first end of the work vehicle in the first position and toward the second end of the work vehicle in the second position, the system comprising:
   a display device;
   at least one imaging device provided in operative association with the work vehicle, the at least one imaging device being configured to generate first image data associated with a first portion of a worksite adjacent the first end of the work vehicle and second image data associated with a second portion of the worksite adjacent the second end of the work vehicle;
   one or more operator input devices, the one or more operator input devices comprising at least one of a gear shift device, a turn-signal device, a stabilizing device, a first control device associated with the first implement, or a second control device associated with the second implement; and
   a computing device communicatively coupled to the display device and the at least one imaging device, the computing device being configured to:
      receive an input indicative of a position of the chair;
      receive an input indicative of an operating state of the work vehicle, the input indicative of the operating state generated by at least one of the one or more operator input devices; and
      control the display device to display a first-end-facing display view or a second-end-facing display view based at least in part on both the position of the chair and the operating state of the work vehicle, the first-end-facing display view being oriented toward the first portion of the worksite and generated based on the first image data, the second-end-facing display view being oriented toward the second portion of the worksite and generated based on the second image data, the first-end-facing display view being different from the second-end-facing display view,
      wherein the computing device is configured to control the display device to display the first-end-facing display view when the chair is in the second position, at least one of the stabilizing device or the first implement is in a transport position, and the second implement is being moved.

2. The system of claim 1, further comprising a position sensor configured to generate data indicative of the position of the chair, the computing device being configured to receive the input indicative of the position of the chair from the position sensor.

3. The system of claim 1, wherein the computing device is configured to control the display device to display the second-end-facing display view when the chair is in the first position, the gear shift device is in a first position indicative of the work vehicle being configured to move in a first direction, the first end being forward of the second end along the first direction, and the turn-signal device is in an indicating position.

4. The system of claim 1, wherein the computing device is configured to control the display device to display the second-end-facing display view when the chair is in the first position and the gear shift device is in a second position indicative of the work vehicle being configured to move in a second direction, the second end being forward of the first end along the second direction.

5. The system of claim 1, wherein the computing device is configured to control the display device to display the second-end-facing display view when the chair is in the second position and the stabilizing device is in a stabilizing position.

6. The system of claim 1, wherein the computing device is configured to determine an operating mode of the work vehicle based at least in part on both the position of the chair and the operating state, wherein the computing device is configured to control the display device based on the operating mode of the work vehicle.

7. The system of claim 1, wherein the at least one imaging device comprises a first imaging device configured to generate the first image data associated with the first portion of the worksite and a second imaging device configured to generate the second image data associated with the second portion of the worksite.

8. The system of claim 1, wherein the at least one imaging device is movable such that a field of view of the at least one imaging device is selectively directable towards the first portion of the worksite or the second portion of the worksite.

9. A method for automatically controlling a display system for a work vehicle, the work vehicle comprising a chassis extending between a first end and a second end, a first implement supported at the first end of the chassis, a second implement supported at the second end of the chassis, and a chair, the chair being selectively movable between a first position and a second position, the chair being oriented toward the first end of the work vehicle in the first position and toward the second end of the work vehicle in the second position, the method comprising:

receiving, with one or more computing devices of a computing system, an input indicative of a position of the chair;

receiving, with the one or more computing devices, an input indicative of an operating state of the work vehicle, the input indicative of the operating state being generated by at least one of one or more operator input devices, the one or more operator input devices comprising a gear shift device, a turn-signal device, a stabilizing device, a first control device associated with the first implement, or a second control device associated with the second implement; and controlling, with the one or more computing devices, a display device to display a first-end-facing display view or a second-end-facing display view based at least in part on both the position of the chair and the operating state of the work vehicle, the first-end-facing display view being oriented toward a first portion of the worksite adjacent the first end of the work vehicle and generated based on first image data, the second-end-facing display view being oriented toward a second portion of the worksite adjacent the second end of the work vehicle and generated based on second image data, the first-end-facing display view being different from the second-end-facing display view, the first image data and the second image data being generated by at least one imaging device provided in operative association with the work vehicle, wherein controlling the display device comprises controlling the display device to display the first-end-facing display view when the chair is in the second position, at least one of the stabilizing device or the first implement is in a transport position, and the second implement is being moved.

10. The method of claim 9, wherein receiving the input indicative of the position of the chair comprises receiving the input indicative of the position of the chair from a position sensor configured to detect the position of the chair.

11. The method of claim 9, wherein controlling the display device comprises controlling the display device to display the second-end-facing display view when the chair is in the first position, the gear shift device is in a first position indicative of the work vehicle being configured to move in a first direction, the first end being forward of the second end along the first direction, and the turn-signal device is in an indicating position.

12. The method of claim 9, wherein controlling the display device comprises controlling the display device to display the second-end-facing display view when the chair is in the first position, and the gear shift device is in a second position indicative of the work vehicle being configured to move in a second direction, the second end being forward of the first end along the second direction.

13. The method of claim 9, wherein controlling the display device comprises controlling the display device to display the second-end-facing display view when the chair is in the second position, and the stabilizing device is in a stabilizing position.

14. The method of claim 9, further comprising determining an operating mode of the work vehicle based at least in part on both the position of the chair and the operating state of the work vehicle, wherein controlling the display device comprises controlling the display device based on the operating mode of the work vehicle.

15. The method of claim 9, wherein the at least one imaging device comprises a first imaging device configured to generate the first image data associated with the first portion of the worksite and a second imaging device configured to generate the second image data associated with the second portion of the worksite.

16. The method of claim 9, wherein the at least one imaging device is movable such that a field of view of the at least one imaging device is selectively directable towards the first portion of the worksite or the second portion of the worksite, the method further comprising moving the at least one imaging device towards the first portion of the worksite or the second portion of the worksite based at least in part on both the position of the chair and the operating state of the work vehicle.

* * * * *